(12) United States Patent
Hong et al.

(10) Patent No.: US 10,683,228 B2
(45) Date of Patent: Jun. 16, 2020

(54) APPARATUS FOR MOLDING GLASS SUBSTRATE

(71) Applicant: Corning Precision Materials Co., Ltd., Chungcheongnam-do (KR)

(72) Inventors: Jae Seon Hong, Chungcheongnam-do (KR); Myung Hwan Kim, Chungcheongnam-do (KR); Bong Chul Kim, Chungcheongnam-do (KR); Jong Hwa Kim, Chungcheongnam-do (KR); Duck Kyo Seo, Chungcheongnam-do (KR); Jae Mun Hwang, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 292 days.

(21) Appl. No.: 15/034,085

(22) PCT Filed: Nov. 4, 2014

(86) PCT No.: PCT/KR2014/010474
§ 371 (c)(1),
(2) Date: May 3, 2016

(87) PCT Pub. No.: WO2015/065141
PCT Pub. Date: May 7, 2015

(65) Prior Publication Data
US 2016/0280576 A1 Sep. 29, 2016

(30) Foreign Application Priority Data
Nov. 4, 2013 (KR) .......................... 10-2013-0132948

(51) Int. Cl.
*C03B 23/035* (2006.01)

(52) U.S. Cl.
CPC ...... *C03B 23/0357* (2013.01); *C03B 2215/50* (2013.01)

(58) Field of Classification Search
CPC ................................................ C03B 23/0357
See application file for complete search history.

(56) References Cited

U.S. PATENT DOCUMENTS 1,236,937 A * 8/1917 Hough ................ C03B 23/0357
40/616
2,352,957 A * 7/1944 Kell .......................... C03B 9/12
65/106

(Continued)

FOREIGN PATENT DOCUMENTS

JP 10025123 A 1/1998
JP 10182176 A 7/1998

(Continued)

OTHER PUBLICATIONS

International Search Report for Application No. PCT/KR2014/010474 dated Mar. 9, 2015.

*Primary Examiner* — John M Hoffmann
(74) *Attorney, Agent, or Firm* — Lerner, David, Littenberg, Krumholz & Mentlik, LLP

(57) ABSTRACT

The present invention relates to an apparatus for molding a glass substrate, and more specifically, to an apparatus for molding a glass substrate capable of forming a glass substrate in a 3D shape and preventing the shape of a vacuum hole from transferring onto the surface of the substrate. To this end, the present invention provides the apparatus for shaping a glass substrate, comprising: a molding frame having a cavity, at least one vacuum hole and at least one decompression hole, wherein the cavity disposed on one surface of the molding frame, the at least one vacuum hole formed in the molding frame below the cavity, the at least one vacuum hole being connected to an external vacuum (Continued)

device, and the at least one decompression hole defined between the cavity and the at least one vacuum hole such that the cavity communicates with the at least one vacuum hole, wherein a width of the at least one decompression hole is greater than a width of the at least one vacuum hole such that the at least one decompression hole lessens vacuum pressure applied to the glass substrate disposed on the cavity through the at least one vacuum hole, wherein all of the at least one vacuum hole are connected to the at least one decompression hole.

7 Claims, 4 Drawing Sheets

(56) References Cited

U.S. PATENT DOCUMENTS

| | | | | |
|---|---|---|---|---|
| 2,699,014 A * | 1/1955 | Otto | ............... | C03B 23/023 220/2.1 A |
| 3,238,031 A * | 3/1966 | Rupert | ............... | C03B 9/12 249/60 |
| 3,528,791 A * | 9/1970 | Giffen | ............... | C03B 23/0357 264/553 |
| 3,552,941 A * | 1/1971 | Giffen | ............... | B29C 67/00 65/177 |
| 3,681,043 A * | 8/1972 | Bognar | ............... | C03B 23/0357 65/103 |
| 3,728,098 A * | 4/1973 | Giffen | ............... | B29C 51/36 249/114.1 |
| 3,846,104 A * | 11/1974 | Seymour | ............... | C03B 23/03 65/104 |
| 4,886,537 A * | 12/1989 | Patrick | ............... | C03B 23/0256 65/387 |
| 6,318,125 B1 | 11/2001 | Diederen et al. | | |
| 8,082,755 B2 * | 12/2011 | Angel | ............... | C03B 23/0256 65/107 |
| 2013/0298608 A1 * | 11/2013 | Langsdorf | ............... | C03B 23/0258 65/103 |

FOREIGN PATENT DOCUMENTS

| | | |
|---|---|---|
| JP | 10218630 A | 8/1998 |
| KR | 100631891 B1 | 10/2006 |
| KR | 100701653 B1 | 3/2007 |

* cited by examiner

APPARATUS FOR MOLDING GLASS SUBSTRATE

CROSS-REFERENCE TO RELATED APPLICATION

This application is a national phase entry under 35 U.S.C. § 371 of International Application No. PCT/KR2014/010474, filed Nov. 4, 2014, published in Korean, which claims priority to Korean Patent Application No. 10-2013-0132948, filed on Nov. 4, 2013, the disclosures of which are incorporated herein by reference.

BACKGROUND OF THE INVENTION

Field of the Invention

The present invention relates to an apparatus for shaping a glass substrate, and more particularly, to an apparatus for shaping a glass substrate able to shape a glass substrate to have a three-dimensional (3D) shape while preventing the shape of a vacuum hole from being transferred to the surface of the glass substrate during vacuum shaping.

Description of Related Art

Glass products are used in a variety of fields. For example, mobile phones use a cover glass to protect a touchscreen glass. Recently, products, the design of which can be varied using cover glasses having unique shapes according to final makers, are gaining increasing interest.

Cover glasses that have been used for mobile phones of the related art have a flat shape or curved corners. However, in response to the various functions and designs of mobile phones, curved glasses in which a pair of opposing edges from among the four edges is curved are currently being used for mobile phones.

A method of fabricating such a cover glass includes: preparing a mold having a cavity with a plurality of shaping holes formed on the bottom of the cavity; disposing the mold on a heated glass substrate; and applying vacuum, i.e. a force of drawing the glass substrate to the plurality of shaping holes, to the glass substrate through the plurality of shaping holes, thereby shaping the glass substrate to have the shape of the cavity. However, in this case, a high-pressure vacuum causes the shape of the vacuum holes to be transferred onto the surface of the shaped glass substrate, thereby leaving marks thereon.

RELATED ART DOCUMENT

Patent Document 1: Korean Patent No. 10-0701653 (Mar. 23, 2007)

BRIEF SUMMARY OF THE INVENTION

Various aspects of the present invention provide an apparatus for shaping a glass substrate able to shape at least one edge portion of the four edges of a glass substrate to have a curved surface while preventing the shape of a vacuum hole from being transferred to the surface of the glass substrate during vacuum shaping.

In an aspect of the present invention, provided is an apparatus for shaping a glass substrate that includes: a molding frame having a cavity, at least one vacuum hole and at least one decompression hole, wherein the cavity disposed on one surface of the molding frame; the at least one vacuum hole formed in the molding frame below the cavity, the at least one vacuum hole being connected to an external vacuum device; and the at least one decompression hole defined between the cavity and the at least one vacuum hole such that the cavity communicates with the at least one vacuum hole, wherein a width of the at least one decompression hole is greater than a width of the at least one vacuum hole such that The at least one decompression hole lessens vacuum pressure applied to the glass substrate disposed on the cavity through the at least one vacuum hole, wherein all of the at least one vacuum hole are connected to the at least one decompression hole.

The apparatus may include a plurality of the vacuum holes and a plurality of the decompression holes. Each decompression hole may correspond to each of the plurality of the vacuum holes.

The apparatus may include a plurality of the vacuum holes. At least two vacuum holes of the plurality of the vacuum holes may be connected to one decompression hole of the at least decompression hole.

Here, the at least two vacuum holes may be arranged in a row or column, and the apparatus may include a plurality of the decompression holes, each of which extends along and is connected to the at least two vacuum holes in the row or column.

In addition, each of the plurality of the decompression holes may have a trench structure in which the at least two vacuum holes arranged in a row or column is exposed.

At least one wall surface of the cavity may be a curved surface such that at least one edge portion of four edges of the glass substrate is shaped to have a curved surface.

The vacuum hole may have a first path having one end adjoining to the decompression hole and a second path connected to the other end of the first path. The inner diameter of the second path may be greater than the inner diameter of the first path.

According to the present invention as set forth above, the decompression hole for reducing a vacuum pressure applied to a glass substrate through the vacuum holes is formed at one side of the vacuum holes that face the glass substrate. With this configuration, a uniform pressure can be applied to one area of the glass substrate that faces the vacuum holes and the other area of the glass substrate, thereby preventing the shape of the vacuum holes from being transferred to the surface of the glass substrate that would otherwise leave marks on the surface of the glass substrate.

In addition, at least one wall surface of the cavity is formed as a curved surface, with which at least one edge portion of the four edges of the glass substrate can be shaped to have a curved surface, i.e. the glass substrate can be shaped to have a three-dimensional (3D) shape.

Furthermore, the diameter of one portion of each vacuum hole connected to the vacuum device is formed greater than the diameter of the opposite portion of each vacuum hole. This can consequently maximize the vacuum pressure applied to the glass substrate and ensure reproducibility in the shaping of the glass substrate.

DETAILED DESCRIPTION OF THE INVENTION

Figure 1:
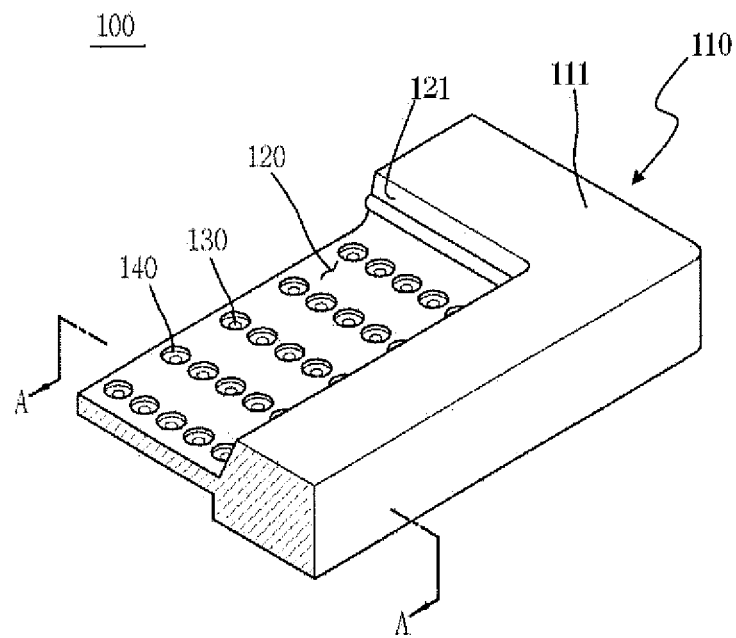
FIG. 1 is a partial perspective view illustrating an apparatus for shaping a glass substrate according to a first exemplary embodiment of the present invention.

Reference will now be made in detail to an apparatus for shaping a glass substrate according to the present invention, embodiments of which are illustrated in the accompanying drawings and described below, so that a person skilled in the art to which the present invention relates could easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted in the case that the subject matter of the present invention is rendered unclear.

Reference will now be made to an apparatus for shaping a glass substrate according to a first exemplary embodiment of the present invention in conjunction with FIG. 1 and FIG. 2.

Figure 2:
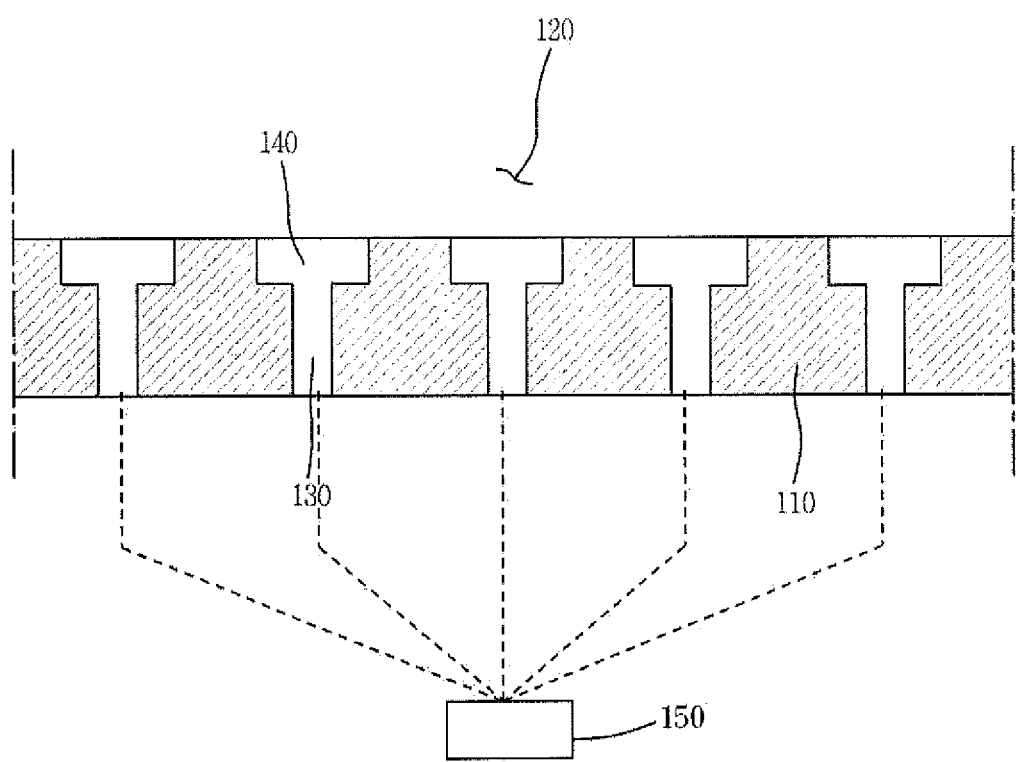
FIG. 2 is a cross-sectional view taken along line A-A in FIG. 1.

FIG. 1 is a partial perspective view illustrating the apparatus for shaping a glass substrate 100 according to the first embodiment, and FIG. 2 is a cross-sectional view taken along line A-A in FIG. 1.

As illustrated in FIG. 1 and FIG. 2, the apparatus for shaping a glass substrate 100 according the first embodiment is a shaping mold that can shape a glass substrate to have a three-dimensional (3D) shape, i.e. shape at least one edge portion of the four edges of the glass substrate to have a curved surface, using a vacuum. Herein, the shaping process using vacuum, i.e. the vacuum shaping, is a method of shaping a glass substrate (not shown) by heating the glass substrate (not shown) to a preset temperature, bringing the heated glass substrate (not shown) into contact with the shaping mold, and pressing the glass substrate (not shown) against the shaping mold using vacuum pressure. That is, the apparatus for shaping a glass substrate 100 according this embodiment is a shaping mold that shapes the glass substrate (not shown) having the shape of a two-dimensional (2D) flat glass to a 3D curved glass by vacuum shaping.

For this, the apparatus for shaping a glass substrate 100 according this embodiment includes a molding frame 110, a cavity 120, vacuum holes 130 and decompression holes 140.

The molding frame 110 forms the outer shape of the apparatus for shaping a glass substrate 100. For example, the molding frame 110 may have an overall box-shaped structure. The molding frame 110 may be made of a material having superior resistance to abrasion, impacts and heat, such as carbon steel, alloy steel or stainless steel.

The molding recess 120 is formed inward from one surface 111 of the molding frame 110, more particularly, one surface 111 of the molding frame 110 that is to face the glass substrate (not shown). Here, since the apparatus for shaping a glass substrate 100 according this embodiment is an apparatus that shapes the glass substrate (not shown) such that the glass substrate (not shown) has a 3D shape, i.e. at least one edge portion of the four edges of the glass substrate (not shown) has a curved surface, at least one wall surface 121 of the cavity 120 that determines the shape of the glass substrate (not shown) is formed as a curved surface. In addition, the width of the cavity 120 is smaller than that of the glass substrate (not shown) in order to impart the curved surface to the glass substrate (not shown).

The vacuum holes 130 provide paths through which vacuum pressure generated from an external vacuum device 150 is transferred to the glass substrate (not shown) aligned on the cavity 120. When the glass substrate (not shown) is being shaped, vacuum, i.e. a force of drawing the glass substrate (not shown) toward the cavity 120, is applied to the glass substrate (not shown) through the vacuum holes 130, thereby shaping the glass substrate (not shown) to have the shape of the cavity 120. The vacuum holes 130 are formed in the molding frame 110 below the cavity 120. The vacuum holes 130 may be in the shape of cylinders. In addition, as illustrated in FIG. 1 and FIG. 2, a plurality of vacuum holes 130 may be provided. The plurality of vacuum holes 130 may be arranged as being aligned in columns and rows in order to cause vacuum pressure to be uniformly applied over the entire surface of the glass substrate (not shown). The plurality of vacuum holes 130 is connected to a vacuum device 150 such as a vacuum pump that is disposed outside. For the sake of efficiency, the plurality of vacuum holes 130 may be connected, at one end thereof, to a common path (not shown) through which the plurality of vacuum holes 130 communicates with each other, and the vacuum device 150 may be connected to the common path (not shown) in a one-to-one relationship. That is, the plurality of vacuum holes 130 may be connected to the vacuum device 150 via the common path (not shown), and vacuum pressure applied from the vacuum device 150 may be connected uniformly distributed before being applied to the glass substrate (not shown) via each of the plurality of vacuum holes 130.

The decompression holes 140 are defined between the cavity 120 and the vacuum holes 130 such that the vacuum holes 130 communicate with the cavity 120, thereby allowing vacuum pressure applied through the vacuum holes 130 to be transferred to the cavity 120. The decompression holes 140 are configured to lessen vacuum pressure applied to the glass substrate (not shown) disposed or aligned on the vacuum recess 120 through the vacuum holes 130. For this, the width of each of the decompression holes 140 may be greater than the width of each of the vacuum holes 130. As illustrated in FIG. 1 and FIG. 2, the decompression holes 140 may be in the shape of cylinders like the vacuum holes 130. In addition, the decompression holes 140 may correspond to the vacuum holes 130 in a one-to-one relationship. When viewed on a plane, one vacuum hole 130 defining a circle is located inside a greater circle defined by one decompression hole 140. Accordingly, when vacuum pressure is transferred to the glass substrate (not shown) through the narrow vacuum holes 130, it is lowered through the wider decompression holes 140 before being applied to the glass substrate (not shown).

As in the related art, when the vacuum holes are in direct contact with the glass substrate (not shown), the shape of the vacuum holes may be transferred to the surface of the glass substrate (not shown) due to high pressure, thereby leaving marks on the surface of the glass substrate (not shown). However, as described above, when the vacuum pressure applied to the glass substrate (not shown) through the vacuum holes 130 is lessened by the decompression holes 140, it is possible to reduce the difference between the pressure applied to one area of the glass substrate (not shown) that faces the vacuum holes 130 and the pressure applied to the other area of the glass substrate (not shown) or make uniform pressure be applied to both areas of the glass substrate, thereby preventing the shape of the vacuum holes 130 from being transferred to the surface of the glass substrate (not shown) that would otherwise leave marks on the surface of the glass substrate (not shown).

Reference will now be made to an apparatus for shaping a glass substrate according to a second exemplary embodiment of the present invention in conjunction with FIG. 3 to FIG. 5.

Figure 3:
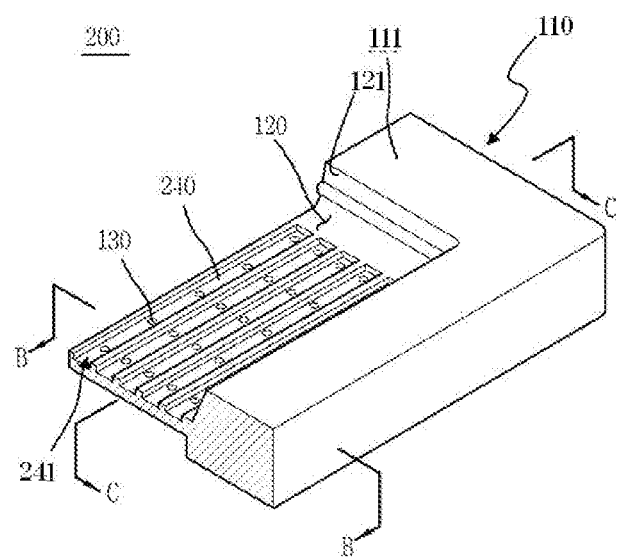
FIG. 3 is a partial perspective view illustrating an apparatus for shaping a glass substrate according to a second exemplary embodiment of the present invention.
Figure 4:
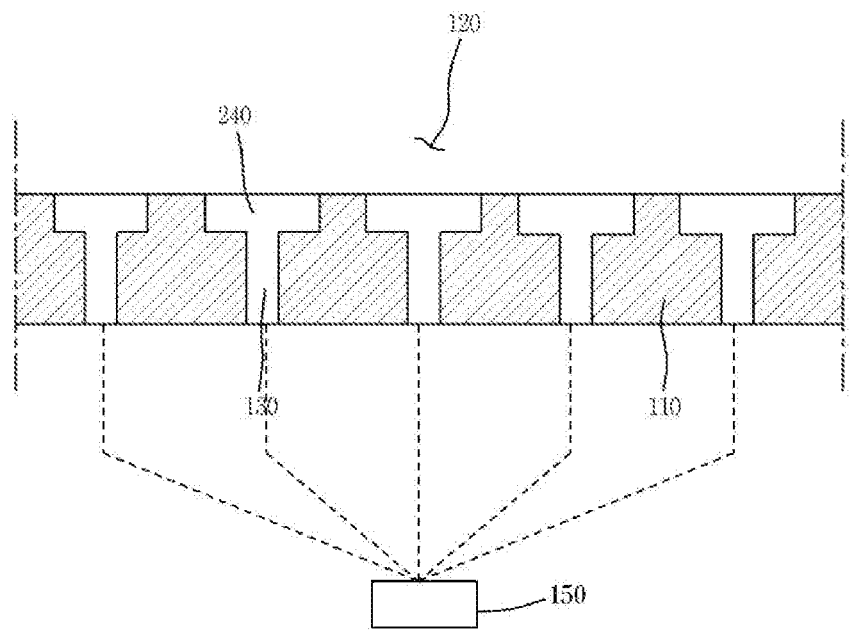
FIG. 4 is a cross-sectional view taken along line B-B in FIG. 3.
Figure 5:
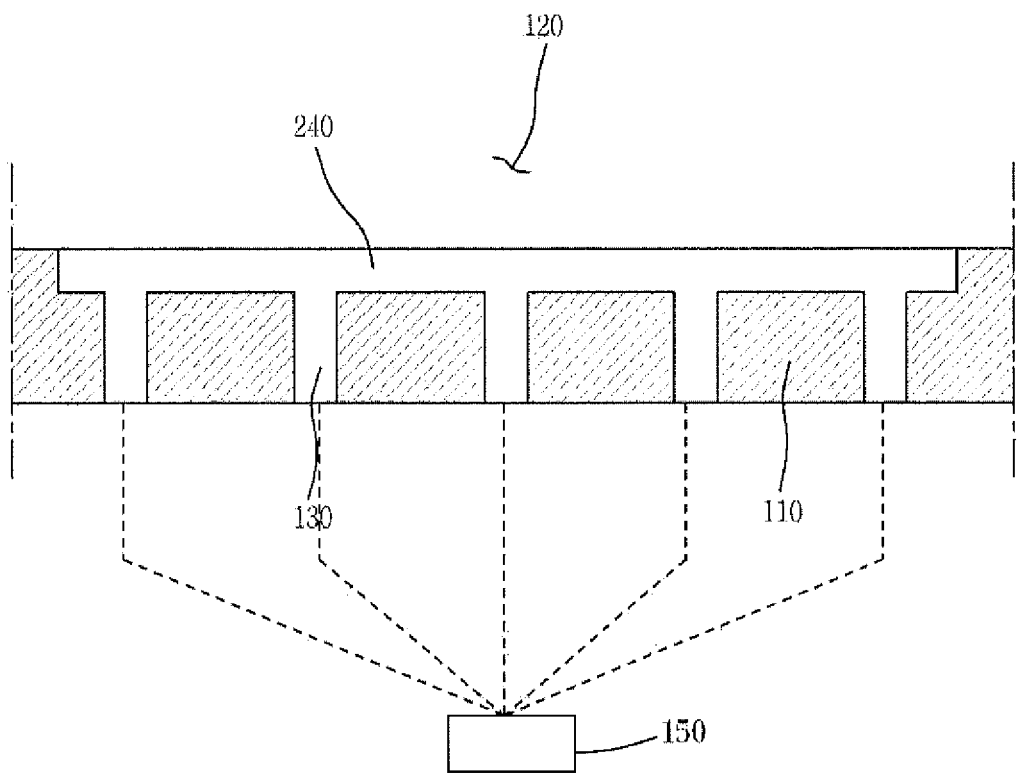
FIG. 5 is a cross-sectional view taken along line C-C in FIG. 3.

FIG. 3 is a partial perspective view illustrating the apparatus for shaping a glass substrate 200 according to the second embodiment, FIG. 4 is a cross-sectional view taken along line B-B in FIG. 3, and FIG. 5 is a cross-sectional view taken along line C-C in FIG. 3.

As illustrated in FIG. 3 to FIG. 5, the apparatus for shaping a glass substrate 200 according to the second embodiment includes a molding frame 110, a cavity 120, vacuum holes 130 and decompression holes 240.

Since the second embodiment is substantially identical to the first embodiment except for the structure of the decompression holes, like reference numerals will be used to designate the same or like elements, descriptions of which are omitted.

As illustrated in FIG. 3 to FIG. 5, according to the second embodiment, a plurality of vacuum holes 130 and a plurality of decompression holes 240 are provided. Here, at least two vacuum holes 130 are connected to each decompression hole 240. Specifically, according to this embodiment, each decompression hole 240 extends along a row or column of the plurality of vacuum holes 130, and a group of vacuum holes 130 of the plurality of vacuum holes 130 arranged in a row or column is connected to each decompression hole 240 and is exposed toward the cavity 120. For example, each decompression hole 240 has a trench structure 241, with which the corresponding group of vacuum holes 130 is exposed toward the cavity 120. In this case, like the decompression holes (140 in FIG. 2) according to the first embodiment of the present invention, the width of each decompression hole 240 is greater than the width of each vacuum hole 130. Since this structure expands the space, a high-vacuum pressure passing through the plurality of vacuum holes 130 can be lessened, thereby preventing the shape of the vacuum holes 130 from being transferred to the surface of the glass substrate (not shown) that would otherwise leave marks the glass surface.

Reference will now be made to an apparatus for shaping a glass substrate according to a third exemplary embodiment of the present invention in conjunction with FIG. 6 and FIG. 7.

Figure 6:
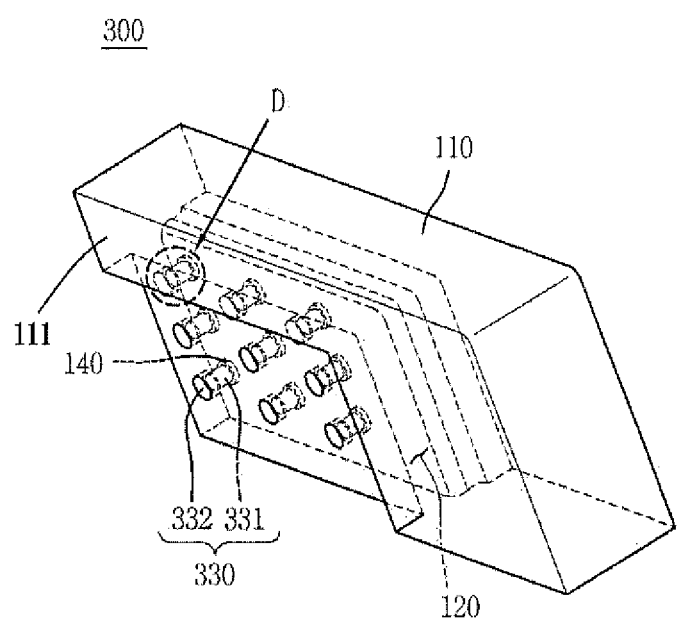
FIG. 6 is a partial perspective view illustrating an apparatus for shaping a glass substrate according to a third exemplary embodiment of the present invention.
Figure 7:
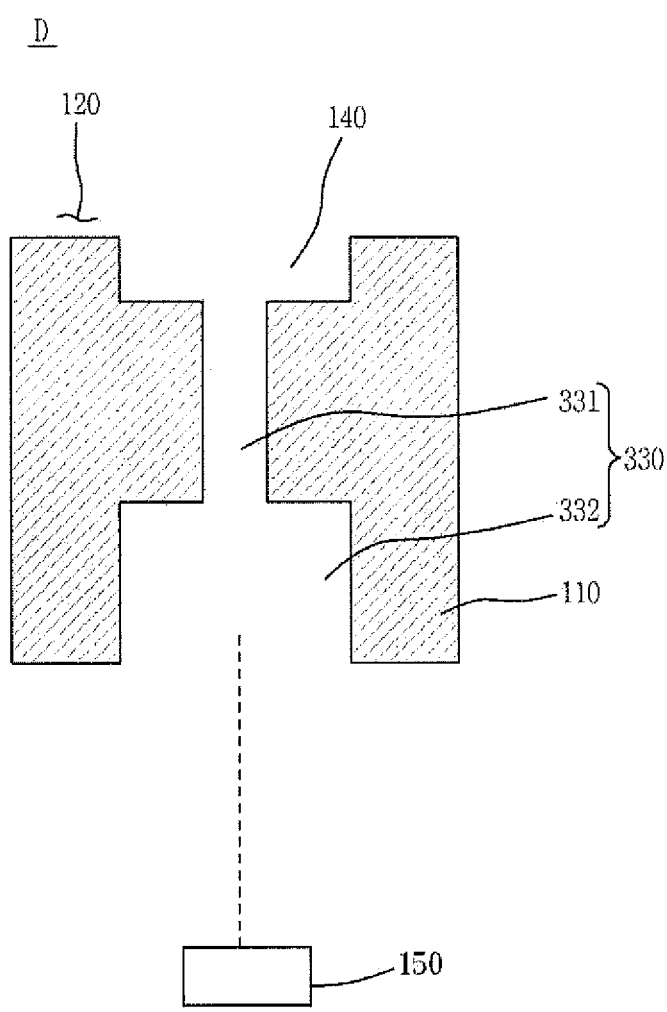
FIG. 7 is an enlarged cross-sectional view of an area "D" in FIG. 7.

FIG. 6 is a partial perspective view illustrating the apparatus for shaping a glass substrate 300 according to the third embodiment, and FIG. 7 is an enlarged cross-sectional view of an area "D" in FIG. 7.

As illustrated in FIG. 6 and FIG. 7, the apparatus for shaping a glass substrate 300 according to the third embodiment includes a molding frame 110, a cavity 120, vacuum holes 330 and decompression holes 140.

Since this embodiment is substantially identical to the first embodiment except for the structure of the vacuum holes, like reference numerals will be used to designate the same or like elements, descriptions of which are omitted.

Each of the vacuum holes 330 according to this embodiment has a two-section structure that includes two sections having different diameters. As illustrated in FIG. 6 and FIG. 7, each vacuum hole 330 includes a first path 331 having one end adjoining to a corresponding decompression hole 140 and a second path 332 connected to the other end of the first path 331. The inner diameter of the second path 332 may be greater than the inner diameter of the first path 331. With this configuration, a vacuum pressure, i.e. a drawing force, applied from a vacuum device 150 can be enhanced when it is transferred from the greater space of the second path 332 to the smaller space of the first path 331, thereby maximizing the vacuum pressure applied to a glass substrate (not shown). This can consequently ensure reproducibility in the shaping of the glass substrate (not shown).

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. An apparatus for shaping a glass substrate, comprising:
   a molding frame having a cavity, at least one vacuum hole and at least one decompression hole,
   wherein the cavity disposed on one surface of the molding frame,
   the at least one vacuum hole formed in the molding frame below the cavity, the at least one vacuum hole being connected to an external vacuum device, and
   the at least one decompression hole defined between the cavity and the at least one vacuum hole such that the cavity communicates with the at least one vacuum hole,
   wherein a width of the at least one decompression hole is greater than a width of the at least one vacuum hole such that the at least one decompression hole lessens vacuum pressure applied to the glass substrate disposed on the cavity through the at least one vacuum hole,
   wherein all of the at least one vacuum hole are directly connected to the at least one decompression hole.

2. The apparatus according to claim 1, wherein the apparatus comprises a plurality of the vacuum holes and a plurality of the decompression holes, the plurality of the decompression holes corresponding to the plurality of the vacuum holes respectively.

3. The apparatus according to claim 1, wherein the apparatus comprises a plurality of the vacuum holes, and at least two vacuum holes of the plurality of the vacuum holes are connected to one decompression hole of the at least one decompression hole.

4. The apparatus according to claim 3, wherein the at least two vacuum holes are arranged in a row or column, and the apparatus comprises a plurality of the decompression holes, each of which is connected to the at least two vacuum holes in the row or column.

5. The apparatus according to claim 4, wherein each of the plurality of the decompression holes comprises a trench structure in which the at least two vacuum holes arranged in a row or column is exposed.

6. The apparatus according to claim 1, wherein at least one wall surface of the cavity comprises a curved surface such that at least one edge portion of four edges of the glass substrate is shaped to have a curved surface.

7. The apparatus according to claim 1, wherein the vacuum hole comprises:
   a first path having one end adjoining to the decompression hole;
   a second path connected to the other end of the first path, wherein an inner diameter of the second path is greater than an inner diameter of the first path.

* * * * *